UNITED STATES PATENT OFFICE.

WILLIAM P. CLOTWORTHY, OF BALTIMORE, MARYLAND.

PRESERVING COCOANUT.

SPECIFICATION forming part of Letters Patent No. 400,303, dated March 26, 1889.

Application filed January 19, 1889. Serial No. 296,855. (No specimens.)

*To all whom it may concern:*

Be it known that I, WILLIAM PITT CLOTWORTHY, a citizen of the United States, residing at the city of Baltimore, in the State of Maryland, have invented a certain new and useful Improvement in the Method of Preparing Cocoanut-Meat for Preservation and Storage; and I do hereby declare that the following is a full, clear, and exact description of the invention, which will enable others skilled in the art to which it appertains to make and use the same.

Heretofore desiccated cocoanut-meat has been preserved by adding to it a certain amount of sugar or of starch, or a mixture of both sugar and starch, and then heating the mass. When prepared for sale, the article thus contained from twenty-five to thirty-three per cent. of foreign substances not desired by the purchaser, but which, on the contrary, only adulterated the cocoanut.

The object of my invention is to so preserve cocoanut for storing that the meat shall retain its desirable qualities—such as the unoxidized oil and the unchanged dextrose—and so that it shall at the same time be a purer, unadulterated, and therefore more desirable article than has yet been produced by any other process.

To carry my invention into effect I reduce the kernel of the cocoanut to a granular state, the grains being of about the size of a pea. The mass is then placed in a metal cylinder, which is then revolved over a moderate fire until the meat assumes a dark-brown color, and is friable when rubbed between the fingers. It should then be removed, and, when cold, placed in a tight vessel. For every pound of the roasted meat there should then be added one ounce of absolute alcohol, in which ten grains of salicylate of soda have been dissolved, then kept well closed until the alcohol preparation is entirely absorbed by the roasted meat, when the article is ready for use. As cocoanut-oil is one of the few vegetable-oils that are perfectly and readily soluble in alcohol, I am thus enabled to make available the valuable properties of alcohol and salicylate of soda as antiseptics and preservatives, as described. The roasting and the addition of the above-mentioned articles effectually prevent any oxidation of the oil of the nut, and hence the meat will keep sweet longer than by any other process.

Having fully described my invention, what I claim, and desire to secure by Letters Patent, is—

The method of preparing the kernel of the cocoanut for preservation and storing by granulating it and then torrefying in a metal cylinder which is revolved over a moderate fire, and when cool adding for every pound of the roasted meat a solution of ten grains of salicylate of soda dissolved in one ounce of absolute alcohol, as described.

WILLIAM P. CLOTWORTHY.

Witnesses:
   MURRAY HANSON,
   WILLIAM H. BERRY.